US010684815B1

(12) United States Patent
Lee et al.

(10) Patent No.: US 10,684,815 B1
(45) Date of Patent: Jun. 16, 2020

(54) INTERFACE CONVERTER AND OPERATION METHOD THEREOF

(71) Applicant: Novatek Microelectronics Corp., Hsinchu (TW)

(72) Inventors: Chi-Han Lee, New Taipei (TW); Wen-Chi Lin, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/261,600

(22) Filed: Jan. 30, 2019

(51) Int. Cl.
*G06F 3/16* (2006.01)

(52) U.S. Cl.
CPC .............. *G06F 3/162* (2013.01); *G06F 3/165* (2013.01)

(58) Field of Classification Search
CPC .... G06F 3/165; G06F 2003/0691; G06F 5/06; G06F 5/12; G06F 5/14; G06F 7/78; G11B 2020/10703; G11B 2020/10805; G11B 2020/10814; H04L 7/005; H04N 5/0736; H04N 21/43; H04N 21/439; H04N 21/4392
USPC .......................................................... 700/94
See application file for complete search history.

(56) References Cited

U.S. PATENT DOCUMENTS

| 6,683,889 B1* | 1/2004 | Shaffer | G06F 5/06 370/516 |
|---|---|---|---|
| 2006/0215782 A1* | 9/2006 | Ahmed | H04L 7/0012 375/272 |
| 2009/0310729 A1* | 12/2009 | Liu | G06F 5/06 375/376 |
| 2013/0083047 A1* | 4/2013 | Shamarao | G09G 3/20 345/547 |

\* cited by examiner

*Primary Examiner* — Walter F Briney, III
(74) *Attorney, Agent, or Firm* — JCIPRNET

(57) ABSTRACT

An interface converter and an operation method of interface converter is provided. The interface converter includes a first media stream receiver, a second media stream transceiver, and a controller. The first media stream receiver is configured to fetch a first media stream for matching a first media stream protocol, wherein the first media stream comprises a link symbol clock and a first audio data with an audio parameter, the first media stream receiver further comprises a buffer having a write indicator and a read indicator for buffering sampled audio data from the first audio data. The second media stream transceiver is coupled to the first media stream receiver, and configured to receive the sampled audio data and a adjusted audio clock for generating a second media stream for matching a second media stream protocol. The controller is coupled to the first media stream receiver, configured to calculate an adjusted audio parameter according to the audio parameter, the write indicator and the read indicator, and generates the adjusted audio clock according to the link symbol clock and the adjusted audio parameter.

20 Claims, 7 Drawing Sheets

INTERFACE CONVERTER AND OPERATION METHOD THEREOF

BACKGROUND

Field of the Invention

The invention relates to an interface converter and more particularly, to an audio interface converter and an operation method thereof.

Description of Related Art

In general, when two electronic devices having different standards, where one of the electronic device may transmit a media stream to the other electronic device through the interface converter. As different standards for media streaming, results in difference in the audio clock and the resolution cause the data mismatch and data traffic. One main issue with the difference in the audio data and the audio clock result in a first in first out (FIFO) (i.e., buffer) underflow/overflow issues. The conventional interface converter, usually correct the audio clock of the electronic device that may need to transmit. By this correction method, results in audio clock been overcorrected, causes the audio clock sink and compatibility issues during conversion.

In one conventional method, by addressing the audio clock sink and the compatibility issue, the audio data may be adjusted by using an audio PLL to generate an audio clock corresponding to the adjusted audio data by the interface converter. By this method of adjusting audio data by using the audio PLL, the difference in the adjusted audio data is too large results in data traffic and cause FIFO overflow/underflow. In another conventional method, to address the FIFO overflow/underflow issue, the FIFO buffer may include write indicator (i.e, W-index) and read indicator (i.e., R-index) in the audio PLL to correct the audio clock mismatch between the two-electronic devices. However, this later method may overcome the FIFO overflow/underflow issue, but the input throughput may not match with the audio data which results in the difference of R index and W index is too large. Owing to the larger difference in R index and W index, the difference in the switching frequency of the audio clock is greater than 0.1% of defined specification. Thus, the change in the audio clock leads to compatibility issue and mis-match between the media streams of two different electronic devices.

SUMMARY

The invention provides an interface converter and an operation method thereof capable of mitigating the frequency differences in audio clock, and compatibility issue which occurs during a process of the conversion between different audio interfaces. At the same time, the resolution and data traffic is maintained.

According to an embodiment of the disclosure, an interface converter is provided. The interface converter includes a first media stream receiver, a second media stream transceiver, and a controller. The first media stream receiver is configured to fetch a first media stream for matching a first media stream protocol. The first media stream includes a link symbol clock and a first audio data with an audio parameter. The first media stream receiver further includes a buffer having a write indicator and a read indicator for buffering sampled audio data from the first audio data. The second media stream transceiver is coupled to the first media stream receiver, and configured to receive the sampled audio data and a adjusted audio clock for generating a second media stream for matching a second media stream protocol. The controller is coupled to the first media stream receiver, and configured to calculate an adjusted audio parameter according to the audio parameter, the write indicator and the read indicator, and generates the adjusted audio clock according to the link symbol clock and the adjusted audio parameter.

According to an embodiment of the disclosure, the controller further includes an audio PLL, and a microcontroller. The audio PLL is coupled to the first media stream receiver to receive the link symbol clock. The microcontroller is coupled to the first media receiver, and configured to receive the first audio data with an audio parameter, the read indicator and the write indicator to generate the adjusted audio parameter for the audio PLL.

According to an embodiment of the disclosure, the controller further includes a clock and data recovery circuit (CDR), an audio PLL, and a microcontroller. The clock and data recovery circuit (CDR) is coupled to the first media stream receiver and the audio PLL configured to receive the first media stream to generate the link symbol clock for the audio PLL. The clock and data recovery circuit includes a phase detector, a charge pump and a voltage controlled oscillator.

According to an embodiment of the disclosure, the audio PLL is coupled to the micro controller, receives the adjusted audio parameter from the micro controller to generate the adjusted audio clock.

According to an embodiment of the disclosure, the first media stream receiver is a display port (DP). The second media transceiver is a high definition multimedia interface (HDMI).

According to an embodiment of the disclosure, the controller calculates the adjusted audio parameter by amplifying the audio parameter by k times, where k is equal to 18.

According to an embodiment of the disclosure, the controller generates the adjusted audio clock by determining the buffer according to the difference of the write indicator and the read indicator. When the difference of the write indicator and the read indicator is 0, the controller determines the buffer is well balanced and keep the original sampled audio data from the first data. When the difference of the write indicator and the read indicator is not equal to 0, then the controller generates the adjusted audio clock to match the second media stream.

According to an embodiment of the disclosure, before determining the buffer of the first media stream, the controller determines the original switching frequency by searching the original switching frequency according to the write indicator, the read indictor and a first predetermined time. The controller iteratively searches the original switching frequency until the buffer of the first media stream is less than the predetermined value.

According to an embodiment of the disclosure, the controller applies the original switching frequency for the audio PLL and wait for a first deglitch time to determine the buffer of the first media stream according to the difference of the write indicator and the read indicator.

According to an embodiment of the disclosure, an operation method of an interface converter includes the steps of: fetching a first media stream for matching a first media stream protocol by a first media stream receiver, the first media stream includes a link symbol clock and a first audio data with an audio parameter, the first media stream receiver further includes a buffer having a write indicator and a read indicator for buffering sampled audio data from the first audio data; calculating an adjusted audio parameter according to the audio parameter, the write indicator and the read indicator, and generates the adjusted audio clock according to the link symbol clock and the adjusted audio parameter by a controller; receiving the sampled audio data and the adjusted audio clock for generating a second media stream for matching a second media stream protocol by a second media stream transceiver.

Based on the above operation method of an interface converter, the interface converter calculates an adjusted audio parameter according to the audio parameter, the write indicator and the read indicator, and generates the adjusted audio clock according to the link symbol clock and the adjusted audio parameter, so as to mitigate the issue of audio clock larger than 0.1% of defined specification and FIFO overflow/underflow issues. At the same time, the data traffic and resolution issues which occurs during the process of the conversion between different streaming interfaces are maintained.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
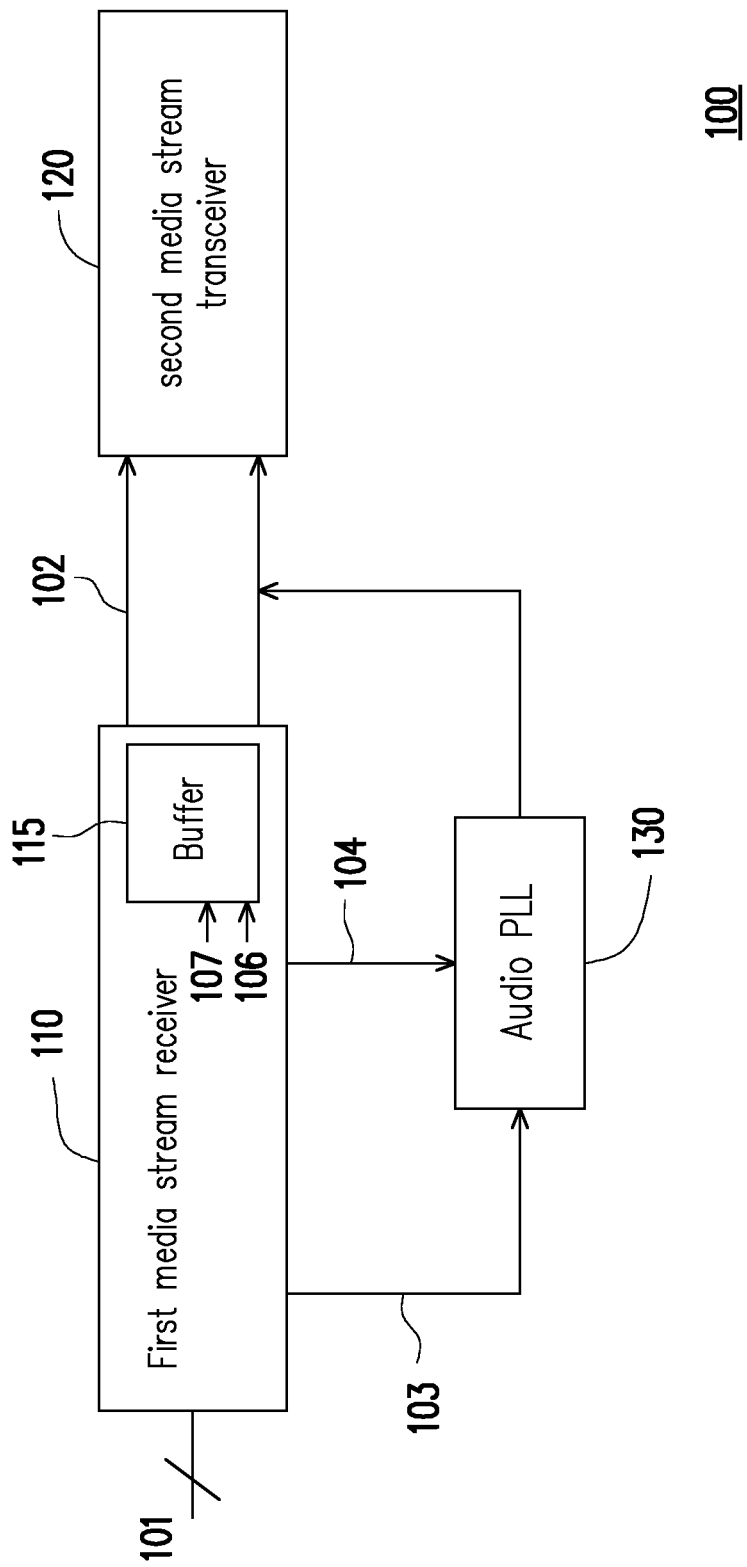
FIG. 1 is a schematic circuit block diagram illustrating an interface converter of a related art.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block diagram illustrating an interface converter 100 of a related art. The interface converter 100 includes a first media stream receiver 110, a second media stream transceiver 120, and an audio PLL 130. The first media stream receiver 110 may have the circuit blocks with the first streaming media standards. Similarly, the second media interface 120 may have the circuit blocks with the second streaming media standards. In some embodiments, the first media stream receiver standard, and the second media stream transceiver standards may be determined according to a design requirement. For an instance, in one embodiment the first media stream receiver 110 may be a DisplayPort (DP) interface and the second media stream transceiver 120 may be a High Definition Multimedia Interface (HDMI).

The first media stream receiver 110 may fetch a first media stream 101 for matching a first media stream protocol. The first media stream 101 includes, a link symbol clock 103, and a first audio data 104 (i.e., an original audio parameter MN 104), and an audio sample data 102. The audio parameters M and N are positive integers, which are determined according to the design requirement. The link symbol clock 103, (i.e., LS_clk) which is also defined as a first audio clock from a first media stream 101 comply with the first media stream protocol. The first media stream receiver 110 further includes a buffer 115, (i.e., FIFO SRAM) used to store the first media stream in the buffer 115 array before transmit the first media steam to the other media stream receiver.

The implementation of the first media stream receiver 110 may be determined according to a design requirement. For an instance, the first media stream receiver 110 may be a conventional media interface comply with the DP interface standard (or other interface standards) or any other media interface.

The first media stream receiver 110 is coupled to the second media interface 120. For an instance, the second media interface 120 may be a conventional media interface comply with the HDMI interface standard (or other interface standards) or any other media interface. Thus, the interface converter 100 may convert the first media stream 101 comply with the first media stream receiver 110 (e.g., the DP interface standard or other interface standards) into the second media stream transceiver 120 complying with the second media stream transceiver standard (e.g., the HDMI standard or other interface standards). The interface converter 100 includes an audio PLL (PLL) 130 coupled with the first media stream receiver 110 to receive the link symbol clock 103. The audio PLL 130 is configured to rebuild the link symbol clock 103 to match the second media stream. The operation method of the interface converter 100 may be detailed as follows, for example, the first media stream 101, includes the link symbol clock 103, LS_clk=540 MHz; and a first audio data 104 (i.e., an original audio parameter MN 104), where M=M1 or M2, the values are determined by the design requirement. In one example for the given LS_clk=540 MHz; M1=1492 and M2=1488; N=32768, and the audio PLL 130 calculates the switching frequency of the first media stream, and a switching frequency fs is calculated as, $$512\ fs = LS_{clk} * \frac{M}{N} \rightarrow \quad (1)$$

Equation (1), represents the switching frequency fs calculation of first media stream 101, based on the above equation (1) with the value of M1=1492; and LS_clk=540 MHz, the switching frequency of the first media stream is calculated as fs1=48022 Hz. Similarly, with the value of M2=1488; and LS_clk=540 MHz, the switching frequency of the first media stream is calculated as fs2=47893 Hz. The original switching frequency of the first media stream fs=48000 Hz. With the above calculated switching frequencies and with different M values, the results are determined to be the first switching frequency fs1 variation is 0.0458%, which is less than 0.1% of the defined specification. Conversely, the variation of calculated switching frequency fs2 over the original switching frequency is determined to be 0.2229%, which is greater than 0.1% of the defined specification. From the above example, the buffer 115 of the conventional interface converter causes the buffer overflow/underflow and with another M value, the switching frequency is greater than 0.1% of defined specification. Thus, by the above method, the buffer overflow/underflow issue or the switching frequency is greater than 0.1% of defined specification is exist during conversion of media streams by the interface converter.

In another conversion method, the interface converter addresses the buffer overflow/underflow issues by including the W-index 106 and R-index 107 to adjust the audio clock 103. The detailed calculation of the interface converter is expressed as follows. In some conventional methods, instead of calculating the switching frequency, the conversion method calculates the differences in the switching frequencies as $\Delta f$. Based on the difference in the switching frequencies, the audio PLL 130, generates the new switching frequency fnew as, $$\frac{R-W}{\frac{LS\_clk}{N}} = \Delta f \rightarrow \quad (2)$$

$$fnew = fold + \Delta f \rightarrow \quad (3)$$

Equation (2), shows the calculation of frequency difference $\Delta f$ by using the W-index 106, R-index 107, and the link symbol clock LS_clock 103, and the first audio parameter N. The audio PLL 130 generates the audio clock with adjusted switching frequency fnew by the frequency difference $\Delta f$ and the original switching frequency of the link symbol clock fold as detailed in expression (3). Based on the above, the adjusted switching frequency generated by the audio PLL 130 may overcome the buffer overflow/underflow issues but in some conditions, there is a mismatch in the audio input throughput, the audio parameters MN 104, and the link symbol clock 103, leads to the difference in large W index 107 and the R index 107. The larger difference in the W index 107 and the R index 107 results in larger frequency differences $\Delta f$ as shown in expression (2). At this condition, when the frequency differences $\Delta f$ changes too large results in the switching frequency fs is greater than 0.1% of defined specification value. Based on the above conventional methods, the problem of buffer underflow/overflow and/or switching frequency fs greater than 0.1% of defined specification exists during the conversion operation performed by the conventional interface converter 100.

Figure 2:
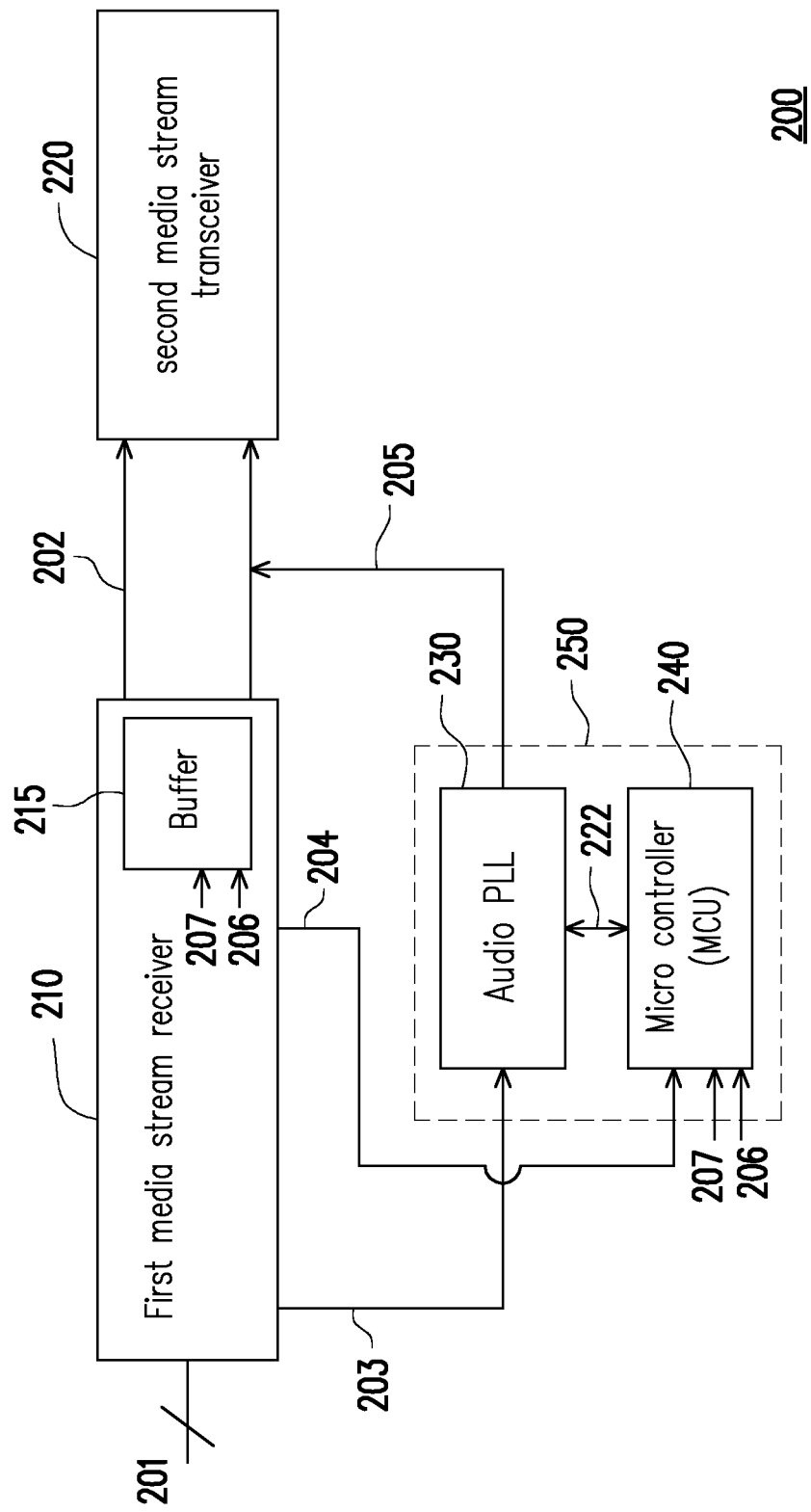
FIG. 2 is a schematic circuit block diagram illustrating an interface converter according to an embodiment of the disclosure.

FIG. 2 is a schematic circuit block diagram illustrating an interface converter 200 according to an embodiment of the disclosure. The interface converter 200 includes a first media stream receiver 210, a second media stream transceiver 220, a controller 250. The controller 250 includes an audio PLL 230, and a microcontroller (MCU) 240. Referring to FIG. 2, the first media stream receiver 210, the second media stream transceiver 220 and the audio PLL 230 are similar to the first media stream receiver 110, the second media stream transceiver 120 and the audio PLL 130, thus the detailed description of these interface is omitted herein. The first media stream receiver 210 further includes a buffer 215, (i.e., FIFO SRAM) used to store the first media stream in the buffer 215 array before transmit the first media steam to the other media stream receiver.

The first media stream receiver 210 may fetch a first media stream 201 for matching a first media stream protocol. The first media stream 201 includes, a first audio data 204 (i.e., an original audio parameter MN 204), an audio sample data 202, a link symbol clock 203, (i.e., LS_clk) which is also defined as a first audio clock from a first media stream 201. The microcontroller 240 is coupled to the first media stream receiver 210 and the audio PLL 230. The microcontroller receives the first audio data 204 (i.e., an original audio parameter MN 204), a W index 206 and the R index 207 to generate the adjusted audio parameter 222, which is also defined as M*N* for the audio PLL 230. The audio parameters M* and N* are positive integers, which are determined according to the design requirement. The microcontroller 240 may be a processor or the user defined controller. The audio PLL 230 generates the adjusted audio clock 205, which is also defined as second audio clock according to the adjusted audio parameter M*N* 222 received from the microcontroller 240 and the link symbol clock 203 from the first media stream receiver 210. The detailed operation of the controller 250 calculates an adjusted audio parameter M*N* 222 according to the first audio data 204 (i.e., the original audio parameter MN 204), the W index 206 and the R index 207 and generates the adjusted audio clock 205 according the link symbol clock 203 and the adjusted audio parameter M*N* 222 is detailed as below.

The controller 250 receives the first audio data 204 (i.e., the original audio parameter MN 204) and calculates the adjusted audio parameter M*N* 222 by amplifying the audio parameter MN 204 by k times, where k is the positive integer value. The value of k is user defined according to the design requirement. In some embodiments, the optimized value of k is determined to be 16 to achieve the better resolution of the first media stream for matching the first media protocol. In some embodiments, the audio parameters are dynamically adjusted in every 1/k steps to obtain the better resolution. In one example, the media stream 201 values are chosen as LS_clk=540 MHz; M1=1492; M2=1488; N=32768. Based on the above amplification steps the audio parameter N is calculated as N=32768*16=524288; M=1488*16=23808. After amplifying the audio parameter MN, the controller 250 calculates the original switching frequency fs to avoid the mismatch between the switching frequency of the audio clock with the original switching frequency fs. Based on the link symbol clock 203, the known value y, and unknown values x are expressed as $$\text{Known value, } y = \text{Tack}_{out} = \frac{1}{fs} \rightarrow \quad (4)$$

$$\text{Unknown value } x = \text{Tack}_{in} \rightarrow \quad (5)$$

From the input media stream, known value y is the time to fill the buffer 215, which is also expressed as Tack$_{out}$, the value of y is calculated as y=1/47894 Hz; and the value of buffer 215 is chosen as 15 (i.e., F=FIFO=15); from the above, the controller 250 calculates the time to fill the buffer 215, which is defined as predetermined time "t". To calculate the buffer IN (i.e., FIFO IN) and buffer OUT (i.e., FIFO OUT), the initial time take to start fill the buffer 215 is defined in terms of difference in the R index 207 and the W index 206 (i.e., R−W=0), and the time taken to fill the buffer 215 is defined as |R−W|=15. From the above predefined values, the time taken to fill the buffer 215 is calculated as t=0.141 s. The next step is to calculate the unknow value x, which is defined as clock in time Tack$_{in}$. The Tack$_{in}$ is expressed as $$\frac{y*F}{|y-x|}*y = t \rightarrow \quad (6)$$

$$\text{for simplification } x = y \pm \frac{F}{t}y^2 \rightarrow \quad (7)$$

Based on the expression (6) and (7), the unknow value y may be calculated by the controller 250, $$20.8798*10^{-6} - \frac{15}{0.141}8(20.879-10^{-6})^2.$$

From the above x and y values the switching frequency of the link symbol clock 203 is calculated as fin=1/x (i.e., 1/Tack$_{in}$); fin=1/20.833 us=48000 Hz. The controller 250 searches the original switching frequency until the buffer 215 of the first media stream is less than then predetermined value. In some embodiments, the predetermined value of the buffer 215 is +2. After determining the original switching frequency, the controller 250 calculates the adjusted audio parameter M* and N* as M*=23808 and N*=540 MHz*23808/512*48000=523125. The adjusted audio parameter M*N* 222 is applied for the audio PLL 230 to calculate the adjusted audio clock 205. Before calculating the adjusted audio clock 205, the controller 250 wait for the first deglitch time, which is also defined as the wait time and calculates the adjusted audio clock 205 according the difference of the W-index 206 and the R-index 207. In some embodiments, the first deglitch time is 300 ms, and the value of the first deglitch time is user defined. Thus, the first deglitch time in the disclosure is not limited thereto. The controller 250 determines the buffer 215 is balanced and/or generates the adjusted audio clock 205 according the difference of the W-index 206 and the R-index 207. When the difference of write indicator and the read indicator is 0 (i.e., R−W=0), the controller 250 determined the buffer 215 is well balanced and keep the original sampled audio data from the first audio data 204 (i.e., the original audio parameter MN 204). When the difference of the W-index 206 and the R-index 207 is not equal to 0 (i.e, R−W≠0), then the controller generates the adjusted audio clock 205 to match the second media stream. The controller further fine tuning the switching frequency by, $$f\text{new} = f\text{old} + (\text{now}_{fifoindex} - \text{old}_{fifoindex}) \rightarrow \quad (8)$$

Expression (8), shows the new switching frequency fnew is generated when the buffer is above the predetermined value. The new switching frequency fnew is calculated by adding the difference of the old buffer index (i.e., W-index 206 and R-index 207) and the new buffer index with the old switching frequency fold. By this way of tuning the switching frequency of the link symbol clock 203 the resolution of the media stream is greatly improved. Based on the above conversion method, performed by the interface converter 200, the FIFO IN and FIFO OUT are well balanced and the switching frequency fs is less than 0.1% of defined specification are achieved. At the same time, the data traffic and the data resolution are maintained.

Figure 3:
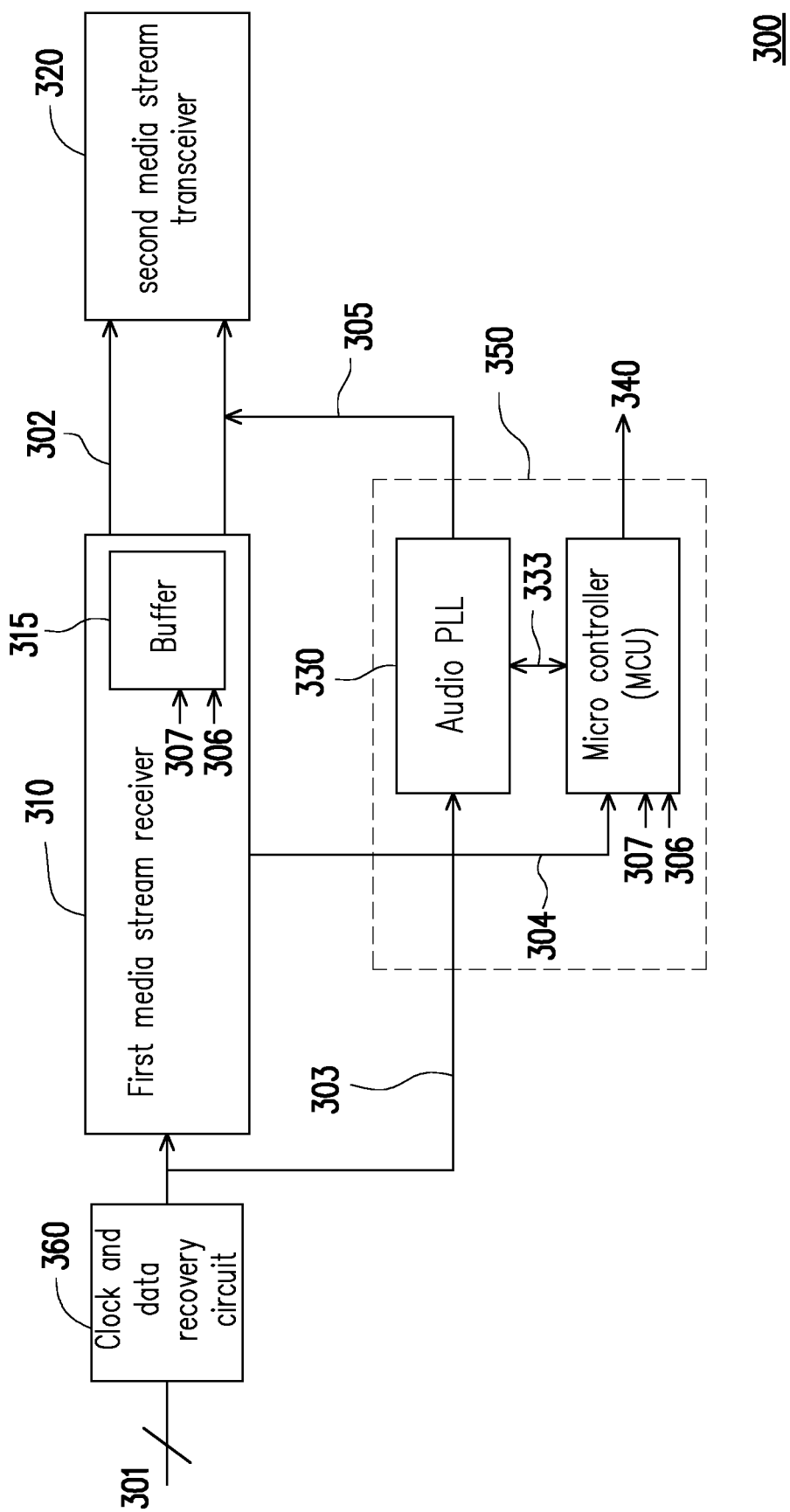
FIG. 3 is a schematic circuit block diagram illustrating an interface converter according to another embodiment of the disclosure.

FIG. 3 is a schematic circuit block diagram illustrating an interface converter 300 according to another embodiment of the disclosure. The interface converter 300 includes a first media stream receiver 310, a second media stream transceiver 320, a clock and data recovery circuit 360 and a controller 350. The controller 350 further includes an audio PLL 330, and a micro controller 340. Referring to FIG. 3, the first media stream receiver 310, the second media stream transceiver 320, the audio PLL 330, and the microcontroller 340 are similar to the first media stream receiver 210, the second media stream transceiver 220, the audio PLL 230, and the microcontroller 240, thus the detailed description of these interface is omitted herein. The first media stream receiver 310 further includes a buffer 315, (i.e., FIFO SRAM) used to store the first media stream in the buffer 315 array before transmit the first media steam to the other media stream receiver.

The first media stream receiver 310 may fetch a first media stream 301 for matching a first media stream protocol. The first media stream 301 includes, a first audio data 304 (i.e., an original audio parameter MN 304), an audio sample data 302, and a link symbol clock 303, (i.e., LS_clk) which is also defined as a first audio clock from a first media stream 301. The microcontroller 340 is coupled to the first media stream receiver 310 and the audio PLL 330. The microcontroller receives the first audio data 304 (i.e., the original audio parameter MN 304), a W index 306 and the R index 307 to generate the adjusted audio parameter 333, which is also defined as M*N* for the audio PLL 330. The audio parameters M* and N* 333 are positive integers, which are determined according to the design requirement. The clock and data recovery circuit 360 receives the first media stream 301 to generate the link symbol clock 303 for the audio PLL 330. The audio PLL 330 generates the adjusted audio clock 305, which is also defined as a second audio clock according to the adjusted audio parameter M*N* 333 received from the microcontroller 340 and the link symbol clock 203 from the clock and data recover circuit 303. The operation of the interface converter 300 are similar operation of the interface converter 200, thus the detailed operation of interface converter 300 is omitted herein.

Figure 4:
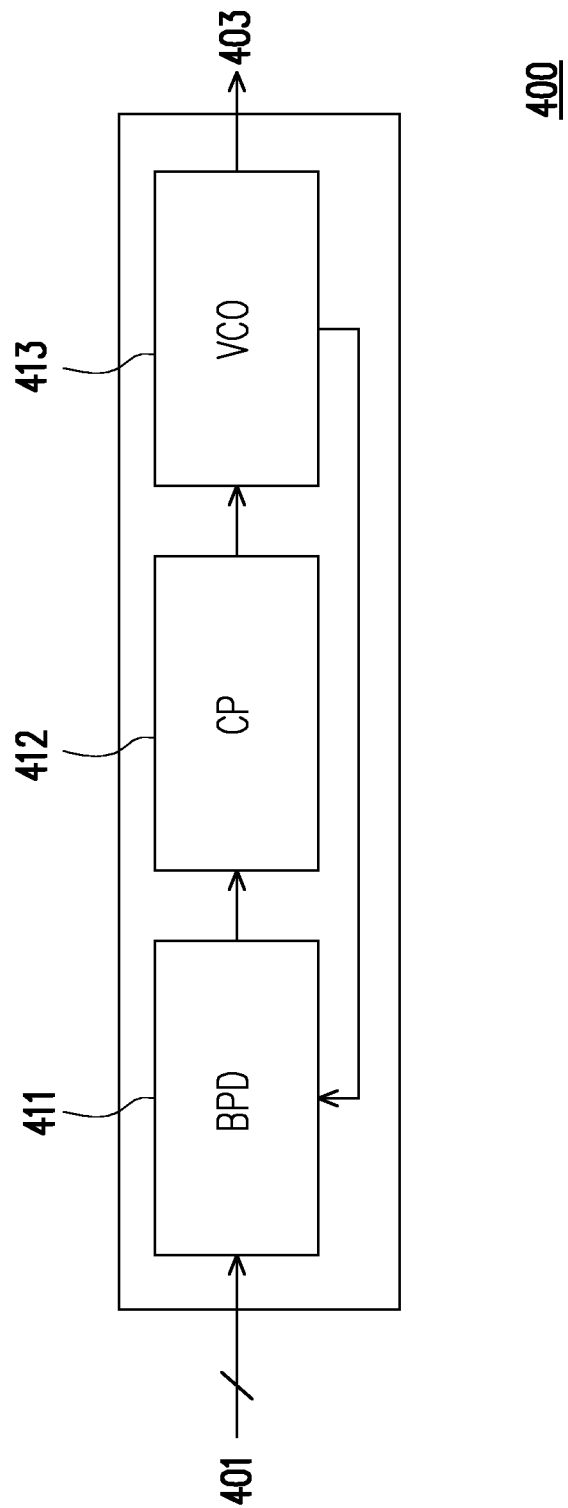
FIG. 4 is a schematic circuit block diagram illustrating a clock and data recovery circuit according to another embodiment of the disclosure.

FIG. 4 is a schematic circuit block diagram illustrating a clock and data recovery circuit 400 according to another embodiment of the disclosure. The clock and data recovery circuit 400 includes a phase detector (BPD) 411, a charge pump (CP) 412, and a voltage controlled oscillator (VCO) 413. The implementation of the clock and data recovery circuit 410 are similar to the conventional clock and data recovery circuit, thus the detailed description of the clock and data recovery circuit is omitted herein. In some embodiments, the implementation of the clock and data recovery circuit 410 are designer choice based on the requirement, hence the clock and data recovery circuit 410 used in the disclosure is not limited thereto. The clock and data recovery circuit 410 receives the first media stream 401. The first media stream 401 is processed by the clock and data recovery circuit 410 and generates a link symbol clock 403, LS_clock for the audio PLL. The audio PLL process the link symbol clock 403 and the adjusted audio data to generate the adjusted audio clock, which is detailed with reference to FIG. 2.

Figure 5A:
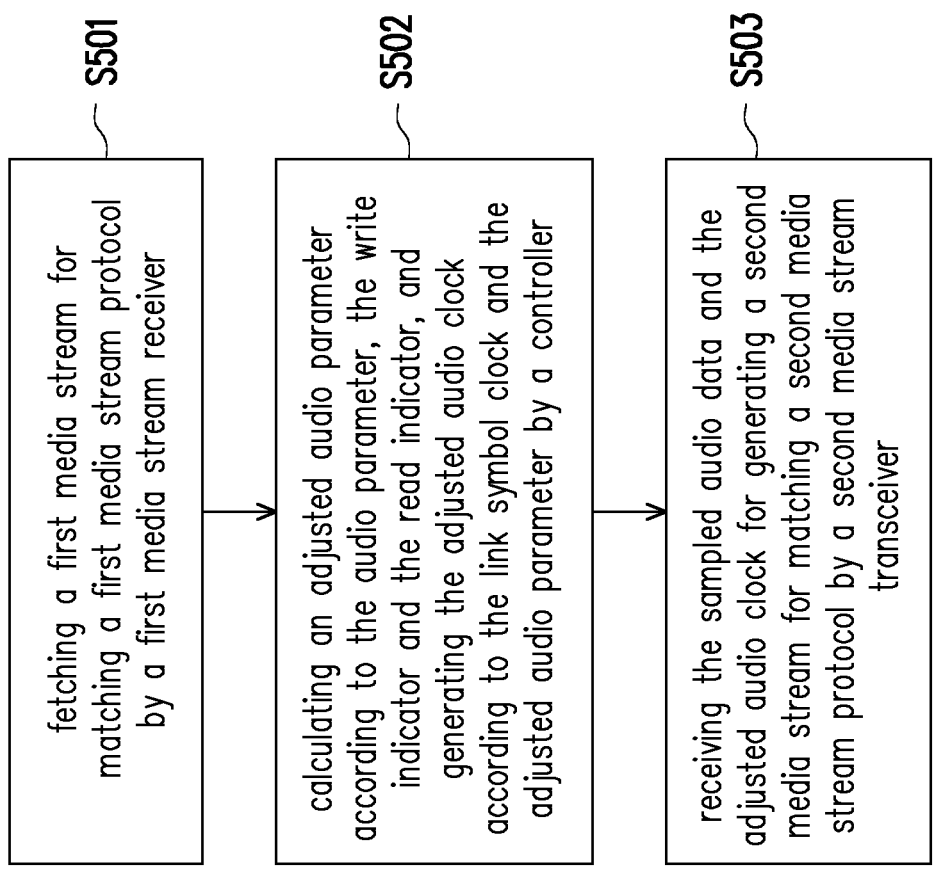
FIG. 5A is a flowchart illustrating an operation method of interface converter according to an exemplary embodiment of the disclosure.

FIG. 5A is a flowchart illustrating an operation method of interface converter according to an exemplary embodiment of the disclosure. In step S501, fetching a first media stream for matching a first media stream protocol by a first media stream receiver. The first media stream includes a link symbol clock and a first audio data with an audio parameter, the first media stream receiver further comprises a buffer having a write indicator and a read indicator for buffering sampled audio data from the first audio data. In step S502, calculating an adjusted audio parameter according to the audio parameter, the write indicator and the read indicator, and generating the adjusted audio clock according to the link symbol clock and the adjusted audio parameter by a controller. In step S503, receiving the sampled audio data and the adjusted audio clock for generating a second media stream for matching a second media stream protocol by a second media stream transceiver. By this operation method, the FIFO IN and FIFO OUT is well balanced and the switching frequency fs is less than 0.1% of defined specification are achieved. At the same time, the data traffic and the data resolution are maintained.

Figure 5B:
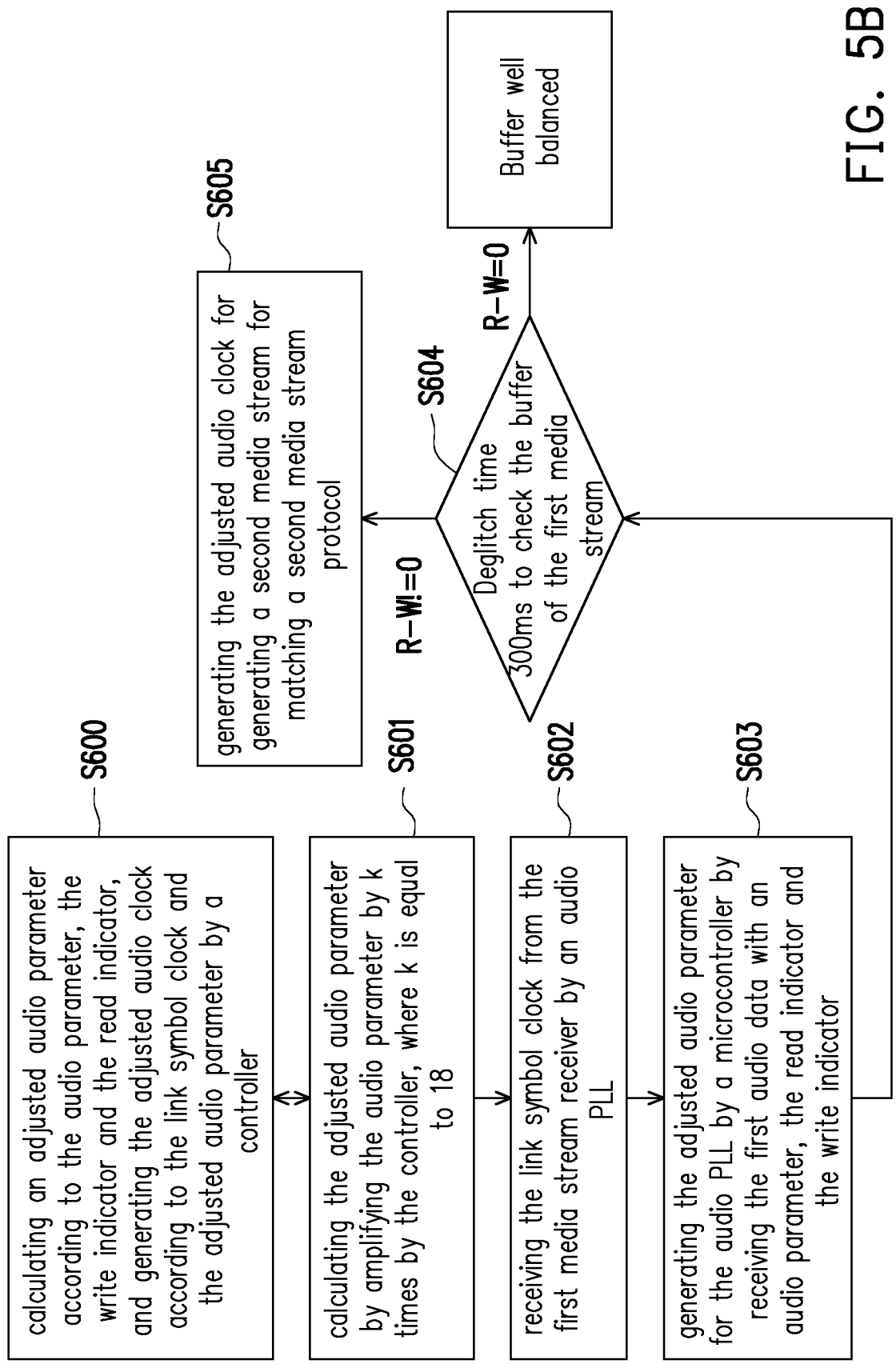
FIG. 5B is a flowchart illustrating an operation method of interface converter according to an exemplary embodiment of the disclosure.
Figure 5C:
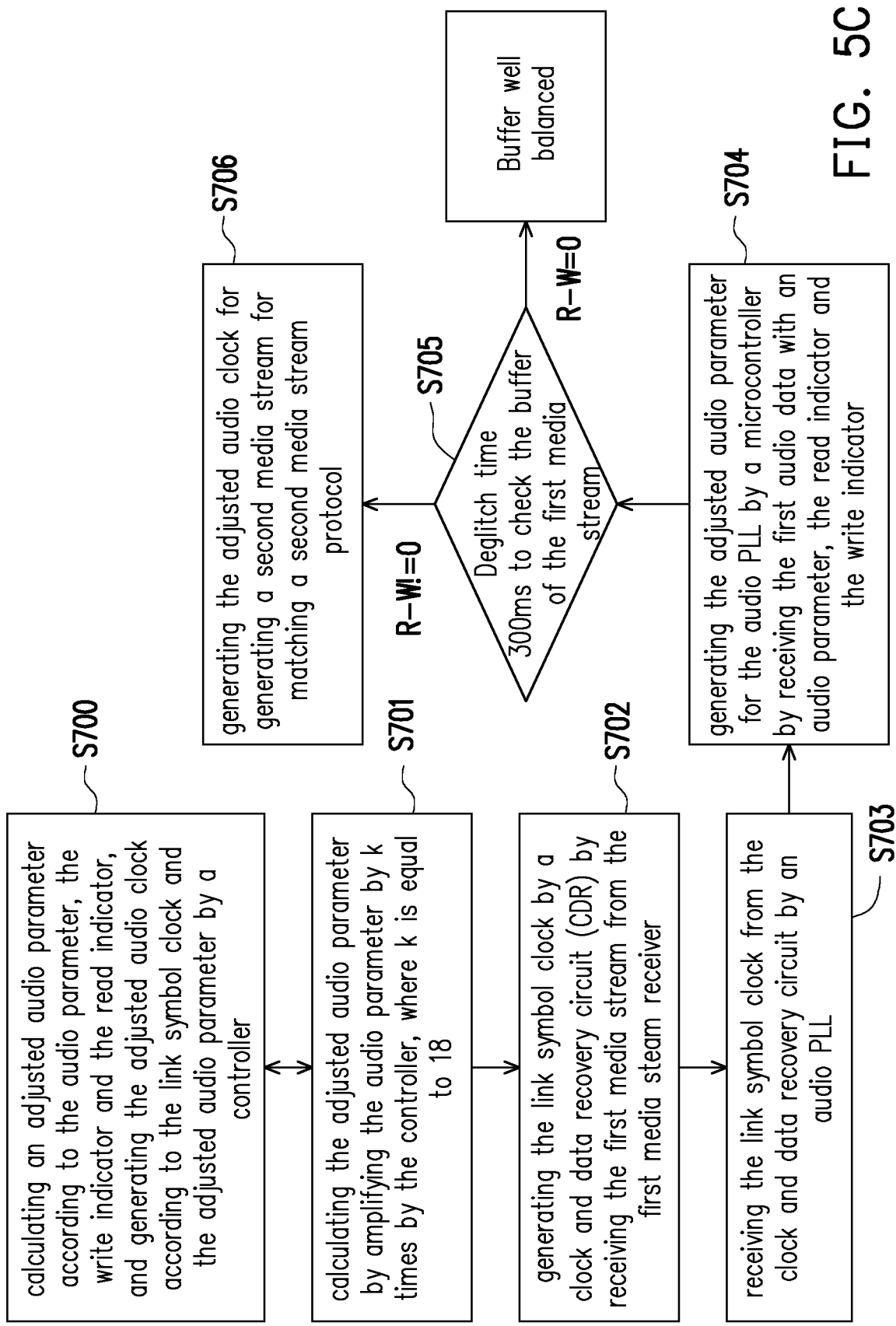
FIG. 5C is a flowchart illustrating an operation method of interface converter according to an exemplary embodiment of the disclosure.

FIG. 5B is a flowchart illustrating an operation method of interface converter according to an exemplary embodiment of the disclosure. The detailed operation calculating an adjusted audio parameter according to the audio parameter, the write indicator and the read indicator, and generating the adjusted audio clock according to the link symbol clock and the adjusted audio parameter by a controller in step S600, perform the steps of calculating the adjusted audio parameter by amplifying the audio parameter by k times by the controller, where k is equal to 18 in step S601. In step 602, receiving the link symbol clock from the first media stream receiver by an audio PLL. In step S603, generating the adjusted audio parameter for the audio PLL by a microcontroller by receiving the first audio data with an audio parameter, the read indicator and the write indicator. After generating the adjusted audio parameter, applying the original switching frequency for the audio PLL and wait for a first deglitch time to determine the buffer of the first media stream according to the difference of the write indicator and the read indicator by the controller in step S604. When the difference of the write indicator and the read indicator is 0, the controller determines the buffer is well balanced and keep the original sampled audio data from the first audio data. when the difference of the write indicator and the read indicator is not equal to 0, then the controller generates the adjusted audio clock to match the second media stream for matching a second media stream protocol in step S605.

FIG. 5B is a flowchart illustrating an operation method of interface converter according to an exemplary embodiment of the disclosure. The detailed operation calculating an adjusted audio parameter according to the audio parameter, the write indicator and the read indicator, and generating the adjusted audio clock according to the link symbol clock and the adjusted audio parameter by a controller in step S700, perform the steps of calculating the adjusted audio parameter by amplifying the audio parameter by k times by the controller, where k is equal to 18 in step S701. In step S702, generating the link symbol clock by a clock and data recovery circuit (CDR) by receiving the first media stream from the first media steam receiver. In step S703, receiving the link symbol clock from the clock and data recovery circuit by an audio PLL. In step S704, generating the adjusted audio parameter for the audio PLL by a microcontroller by receiving the first audio data with an audio parameter, the read indicator and the write indicator. After generating the adjusted audio parameter, applying the original switching frequency to the audio PLL and wait for the first deglitch time to determine the buffer of the first media stream according to the difference of the write indicator and the read indicator by the controller in step S705. When the difference of the write indicator and the read indicator is 0, the controller determines the buffer is well balanced and keep the original sampled audio data from the first audio data. when the difference of the write indicator and the read indicator is not equal to 0, then the controller generates the adjusted audio clock to match the second media stream for matching a second media stream protocol in step S706. By this operation method, the FIFO IN and FIFO OUT is well balanced and the switching frequency fs is less than 0.1% of defined specification are achieved. At the same time, the data traffic and the data resolution are maintained.

It should be noted that in various application scenarios, related functions of the first media stream receiver 210, and the second media stream transceiver 220 and the controller 250 may be implemented as software, firmware or hardware by using general purpose programming languages (e.g., C or C++), hardware description languages (e.g., Verilog HDL or VHDL) or other suitable programming languages. The programming languages capable of executing the functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The programming languages may be stored in the computer-accessible media for a processor of the computer to access/execute the programming codes of the software (or firmware). In the hardware implementation, the functions of the embodiments of the invention can be implemented or executed by one or more controllers, microcontrollers, microprocessors, application-specific integrated circuits (ASICs), digital signal processors (DSPs), field programmable gate array (FPGAs) and/or other various logical blocks, modules and circuits of other processing units. In addition, the device and the method of the invention can be implemented through a combination of hardware and software.

In light of the foregoing, in the interface converter and the operation method thereof provided by the embodiments of the invention, the interface converter may calculate an adjusted audio parameter according to the audio parameter, the write indicator and the read indicator, and generates the adjusted audio clock according to the link symbol clock and the adjusted audio parameter. Thus, the interface converter mitigates the FIFO overflow/underflow issues and the switching frequency greater than the 0.1% of defined specification. At the same time, the data traffic and the data resolution is maintained.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An interface converter, comprising:
   a first media stream receiver, configured to fetch a first media stream for matching a first media stream protocol, wherein the first media stream comprises a link symbol clock and a first audio data with an audio parameter, wherein the first media stream receiver further comprises a buffer having a write indicator and a read indicator for buffering sampled audio data from the first audio data;

a second media stream transceiver, coupled to the first media stream receiver, configured to receive the sampled audio data and an adjusted audio clock for generating a second media stream for matching a second media stream protocol; and a controller, coupled to the first media stream receiver, configured to calculate an adjusted audio parameter according to the audio parameter, the write indicator and the read indicator, and generates the adjusted audio clock according to the link symbol clock and the adjusted audio parameter, wherein the controller is further configured to calculate a plurality of switching frequencies and selects an original switching frequency from the plurality of calculated switching frequencies by searching the plurality of calculated switching frequencies according to the write indicator, the read indictor and a first predetermined time.

2. The interface converter of claim 1, the controller further comprising:

an audio PLL, coupled to the first media stream receiver to receive the link symbol clock;

a microcontroller, coupled to the first media receiver configured to receive the first audio data with an audio parameter, the read indicator and the write indicator to generate the adjusted audio parameter for the audio PLL.

3. The interface converter of claim 2, the controller further comprising:

a clock and data recovery circuit (CDR), coupled to the first media stream receiver and the audio PLL configured to receive the first media stream to generate the link symbol clock for the audio PLL, wherein the clock and data recovery circuit comprising a phase detector, a charge pump and a voltage controlled oscillator.

4. The interface converter of claim 3, wherein the audio PLL coupled to the microcontroller, receives the adjusted audio parameter from the microcontroller to generate the adjusted audio clock.

5. The interface converter of claim 2, wherein the audio PLL coupled to the microcontroller, receives the adjusted audio parameter from the microcontroller to generate the adjusted audio clock.

6. The interface converter of claim 1, wherein the first media stream receiver is a display port (DP); the second media transceiver is a high definition multimedia interface (HDMI).

7. The interface converter of claim 1, wherein the controller calculates the adjusted audio parameter by amplifying the audio parameter by k times, where k is equal to 18.

8. The interface converter of claim 1, wherein the controller generates the adjusted audio clock by determining the buffer according to the difference of the write indicator and the read indicator, when the difference of the write indicator and the read indicator is 0, the controller determines the buffer is well balanced and keep the original sampled audio data from the first audio data, when the difference of the write indicator and the read indicator is not equal to 0, then the controller generates the adjusted audio clock to match the second media stream.

9. An operation method of an interface converter comprising:

fetching a first media stream for matching a first media stream protocol by a first media stream receiver, wherein the first media stream comprises a link symbol clock and a first audio data with an audio parameter, the first media stream receiver further comprises a buffer having a write indicator and a read indicator for buffering sampled audio data from the first audio data;

calculating an adjusted audio parameter according to the audio parameter, the write indicator and the read indicator, and generating the adjusted audio clock according to the link symbol clock and the adjusted audio parameter by a controller, wherein the controller is further configured to calculate a plurality of switching frequencies and selects an original switching frequency from the plurality of calculated switching frequencies by searching the plurality of calculated switching frequencies according to the write indicator, the read indictor and a first predetermined time; and receiving the sampled audio data and the adjusted audio clock for generating a second media stream for matching a second media stream protocol by a second media stream transceiver.

10. The operation method of the interface converter of claim 9, calculating an adjusted audio parameter by the controller further comprising:

receiving the link symbol clock from the first media stream receiver by an audio PLL;

generating the adjusted audio parameter for the audio PLL by a microcontroller by receiving the first audio data with an audio parameter, the read indicator and the write indicator.

11. The operation method of the interface converter of claim 10, calculating an adjusted audio parameter by the controller further comprising:

generating the link symbol clock for the audio PLL by a clock and data recovery circuit (CDR) by receiving the first media stream from the first media steam receiver, wherein the clock and data recovery circuit comprising a phase detector, a charge pump and a voltage controlled oscillator.

12. The operation method of the interface converter of claim 11, wherein receiving the link symbol clock from the clock and data recovery circuit by an audio PLL further comprising:

generating the adjusted audio clock by the audio PLL by receiving the adjusted audio parameter from the microcontroller.

13. The operation method of the interface converter of claim 10, wherein receiving the link symbol clock from the first media stream receiver by an audio PLL further comprising:

generating the adjusted audio clock by the audio PLL by receiving the adjusted audio parameter from the microcontroller.

14. The operation method of the interface converter of claim 9, wherein the first media stream receiver is a display port (DP); the second media transceiver is a high definition multimedia interface (HDMI).

15. The operation method of the interface converter of claim 9, wherein
calculating the adjusted audio parameter by amplifying the audio parameter by k times by the controller, where k is equal to 18.

16. The operation method of the interface converter of claim 9, wherein
generating the adjusted audio clock by determining the buffer according to the difference of the write indicator and the read indicator by the controller,
when the difference of the write indicator and the read indicator is 0, the controller determines the buffer is well balanced and keep the original sampled audio data from the first audio data,
when the difference of the write indicator and the read indicator is not equal to 0, then the controller generates the adjusted audio clock to match the second media stream.

17. An interface converter, comprising:
a first media stream receiver, configured to fetch a first media stream for matching a first media stream protocol, wherein the first media stream comprises a link symbol clock and a first audio data with an audio parameter, wherein the first media stream receiver further comprises a buffer having a write indicator and a read indicator for buffering sampled audio data from the first audio data;
a second media stream transceiver, coupled to the first media stream receiver, configured to receive the sampled audio data and an adjusted audio clock for generating a second media stream for matching a second media stream protocol; and
a controller, coupled to the first media stream receiver, configured to calculate an adjusted audio parameter according to the audio parameter, the write indicator and the read indicator, and generates the adjusted audio clock according to the link symbol clock and the adjusted audio parameter,
wherein the controller generates the adjusted audio clock by determining whether the buffer is balanced according to the difference of the write indicator and the read indicator,
when the difference of the write indicator and the read indicator is 0, the controller determines the buffer is well balanced and keep the original sampled audio data from the first audio data, and
when the difference of the write indicator and the read indicator is not equal to 0, then the controller generates the adjusted audio clock to match the second media stream, and
wherein before determining whether the buffer of the first media stream is balanced, the controller calculates a plurality of switching frequencies and selects an original switching frequency from the plurality of calculated switching frequencies by searching the plurality of calculated switching frequencies according to the write indicator, the read indictor and a first predetermined time, and
the controller iteratively searches the switching frequencies until the buffer of the first media stream is less than the predetermined value.

18. The interface converter of claim 17, wherein
the first media stream receiver is a display port (DP);
the second media transceiver is a high definition multimedia interface (HDMI).

19. The interface converter of claim 17, wherein
the controller calculates the adjusted audio parameter by amplifying the audio parameter by k times, where k is equal to 18.

20. The interface converter of claim 17, the controller further comprising:
an audio PLL, coupled to the first media stream receiver to receive the link symbol clock;
a microcontroller, coupled to the first media receiver configured to receive the first audio data with an audio parameter, the read indicator and the write indicator to generate the adjusted audio parameter for the audio PLL; and
a clock and data recovery circuit (CDR), coupled to the first media stream receiver and the audio PLL configured to receive the first media stream to generate the link symbol clock for the audio PLL,
wherein the clock and data recovery circuit comprising a phase detector, a charge pump and a voltage controlled oscillator.

* * * * *